US008703068B1

(12) United States Patent
Stonehouse et al.

(10) Patent No.: US 8,703,068 B1
(45) Date of Patent: Apr. 22, 2014

(54) COUNTERFEIT DETECTION KIT

(75) Inventors: Jonathan Richard Stonehouse, Windlesham (GB); Christopher Hebden Nunn, Egham (GB); Robert Stephen Honkonen, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 656 days.

(21) Appl. No.: 12/657,955

(22) Filed: Jan. 29, 2010

Related U.S. Application Data

(60) Provisional application No. 61/209,186, filed on Mar. 4, 2009.

(51) Int. Cl.
*G06K 9/64* (2006.01)
*G06K 9/00* (2006.01)

(52) U.S. Cl.
USPC .............................................. 422/430; 422/50

(58) Field of Classification Search
USPC ...................... 422/61, 50; 210/183, 182, 175; 436/172, 20, 164; 356/71
See application file for complete search history.

(56) References Cited

U.S. PATENT DOCUMENTS

| | | | | |
|---|---|---|---|---|
| 6,490,030 | B1 * | 12/2002 | Gill et al. | 356/71 |
| 2004/0219287 | A1 * | 11/2004 | Regan et al. | 427/7 |

FOREIGN PATENT DOCUMENTS

| | | | |
|---|---|---|---|
| CN | 1080053 | | 12/1993 |
| CN | 1186959 | | 7/1998 |
| DE | 10205506 | | 6/2003 |
| WO | WO03097858 | | 11/2003 |
| WO | WO2007048926 | A2 | 5/2007 |
| WO | WO2007054689 | | 5/2007 |

OTHER PUBLICATIONS

Costero et al. "A selective colorimetric chemodosimeter for the naked eye detection of benzoate anion" Tetrahedron Letters, 47, 2006 Internet: http://www.sciencedirect.com pp. 6561-6564.

* cited by examiner

*Primary Examiner* — Christine T Mui
(74) *Attorney, Agent, or Firm* — David K Mattheis; Kim W Zerby

(57) ABSTRACT

The present disclosure provides a kit for detecting counterfeit consumer products. The kit includes a plurality of test protocols to determine the presence or absence of one or more active component, diluent component, and/or preservative component in a consumer product. Methods of making and using the counterfeit detection kit are also described.

18 Claims, 3 Drawing Sheets

Counterfeit sample

Paraben containing sample

COUNTERFEIT DETECTION KIT

CROSS REFERENCE TO RELATED APPLICATIONS

This application claims the benefit of U.S. Provisional Application No. 61/209,186, filed Mar. 4, 2009.

FIELD OF THE INVENTION

This disclosure relates to a kit for the detection of counterfeit consumer products and methods of producing and using the kit. The kit includes a series of test protocols to determine the authenticity of a consumer product.

BACKGROUND OF THE INVENTION

Popular consumer products are common targets for counterfeiters. In is estimated that approximately 2-3% of all fast moving consumer goods sold are counterfeit. To various large companies, this can represent millions to billions of dollars of lost sales every year.

In addition to lost monetary income, such counterfeit products can also impact brand equity. Since counterfeit products are typically inferior in quality and performance compared to the authentic product, consumers who are unaware of the counterfeit nature of the product may associate the lowered quality with the brand name product. Thus, consumers may incorrectly link the inferior qualities to the brand name or even to other products manufactured by the producer of the authentic product and as a result, avoid purchasing further products from the manufacturer of the authentic product.

Many manufacturers attempt to counteract the effects of counterfeiting by actively detecting and removing counterfeit products from the market, for example by intercepting shipments of counterfeit products at global custom ports so they can be seized and destroyed. These activities rely on being able to quickly detect counterfeit products so that action can be taken. For example, in one system when a suspect shipment arrives at a custom port, custom authorities contact the organization, who then helps identify whether the shipment is authentic or counterfeit. However, depending on location and local laws, the shipment may need to be held between 5-10 days while its authenticity is verified. Typically, if the authenticity of a consumer good in a shipment cannot be confirmed by visual assessment, it is sent to an analytical laboratory where complex analytical tests methods, such as nuclear magnetic resonance spectroscopy, infrared spectroscopy, mass spectrometry, x-ray fluorescence, optical microscopy, and the like, are used to identify the product. While visual assessment may be sufficient to identify crude counterfeit, as counterfeiting becomes more sophisticated, the need for analytical testing will increase.

There are multiple limitations to the current system for detecting counterfeit consumer goods. For example, in many jurisdictions, customs or other officials may not have the means or knowledge to detect whether a consumer good is authentic or counterfeit. Thus, the manufacturer can become responsible for policing the authenticity of its products throughout the world. However, geographic, time, and economic concerns, among others, may make manufacturer based policing difficult. For example, certain geographic locations may not be readily accessible for manufacturer based policing and other custom ports may not be legally able to release sample products for testing. Limits on how long a shipment may be held while awaiting test results is also a concern. In addition, many of the current analytical test protocols require expensive and non-portable analytical instruments and highly qualified technicians to test a sample for its authenticity. Thus, there is a need for a portable on-site kit for testing consumer products to determine their authenticity.

SUMMARY OF THE INVENTION

Embodiments of the present disclosure relate to a kit for the detection of counterfeit consumer products and methods of producing the kit and use thereof. One embodiment of the present disclosure provides for a kit for detecting counterfeit consumer products. The kit comprises at least one test protocol for detecting the presence of an active component in a consumer product, at least one test protocol for detecting the presence of a diluent component or a metal ion component in a consumer product, and at least one test protocol for detecting the presence of a preservative component in a consumer product. The consumer product may be selected from the group consisting of a hair care product, a skincare product, a fabric care product, a dental care product, a fine fragrance product, a health care product, a homecare product, a cosmetics product, a battery, a razor or razor blade product, a beverage product, and combinations of any thereof.

In other embodiments, the present disclosure provides for a kit for detecting counterfeit consumer products comprising a set of instructions and two or more test protocols selected from the group consisting of one or more test protocols for detecting a counterfeit hair care product, one or more test protocols for detecting a counterfeit skincare product, and one or more test protocols for detecting a counterfeit fabric care product.

Further embodiments of the present disclosure provide methods for detecting counterfeit consumer products. The methods comprise selecting a consumer product for testing, selecting an appropriate test protocol from a kit for detecting counterfeit consumer products, testing the consumer product with the test protocol, and analyzing results of the test protocol to determine whether the consumer product is counterfeit or authentic. The kit for detecting counterfeit consumer products may be any of the various embodiments of the kits described herein. In one embodiment, the kit for detecting counterfeit consumer products comprises at least one test protocol for detecting the presence of an active component in a consumer product, at least one test protocol for detecting the presence of a diluent component in a consumer product, and at least one test protocol for detecting the presence of a preservative component in a consumer product. The consumer product may be selected from the group consisting of a hair care product, a skincare product, a fabric care product, a dental care product, a fine fragrance product, a health care product, a homecare product, a cosmetics product, a battery, a razor or razor blade product, a beverage product, and combinations of any thereof.

Still other embodiments of the present disclosure provide methods for producing a kit for detecting counterfeit consumer products. The methods comprise selecting a set of test protocols for detecting counterfeit consumer products, configuring the set of test protocols in a kit for detecting counterfeit consumer products, and providing instructions for using the test protocols to detect counterfeit consumer products. In certain embodiments of the methods, the test protocols comprise at least one test protocol for detecting the presence of an active component in a consumer product, at least one test protocol for detecting the presence of a diluent component in a consumer product, and at least one test protocol for detecting the presence of a preservative component in a consumer product.

DETAILED DESCRIPTION OF THE INVENTION

Definitions

Figure 1:
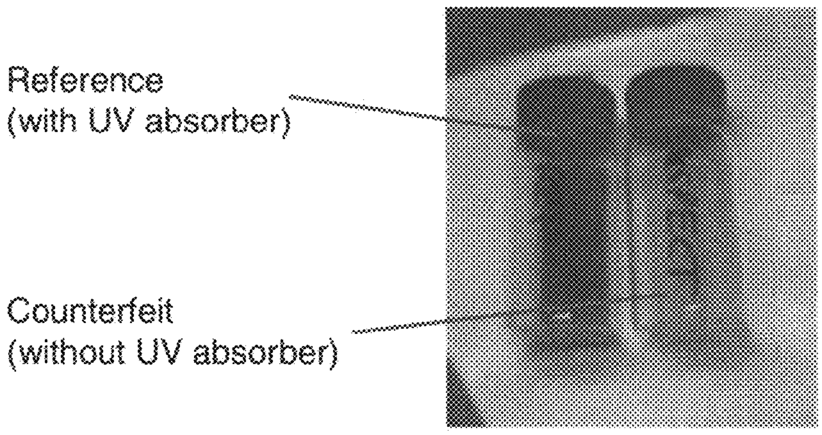
FIG. 1 An illustration of positive and negative results of the test kit for fine fragrance products.

As used herein, the term "comprising" means various components conjointly employed in the preparation of the compositions of the present disclosure. Accordingly, the terms "consisting essentially of" and "consisting of" are embodied in the term "comprising".

As used herein, the articles including "the", "a" and "an" when used in a claim or in the specification, are understood to mean one or more of what is claimed or described.

As used herein, the terms "include", "includes" and "including" are meant to be non-limiting.

As used herein, the term "plurality" means more than one.

As used herein, the term "test protocol" means a procedure, instrument, and/or apparatus for testing a consumer product to determine the authenticity of the product. For example, a test protocol may include one or more test reagents, a UV light, and/or a test strip which when used according to the described procedure detects the presence or absence of a target compound.

As used herein, the term "counterfeit" means that the consumer product is an imitation of the authentic or genuine consumer product and not manufactured by an authorized or licensed manufacturer.

As used herein, the term "kit" means a combinations of two or more test protocols for determining the authenticity of one or more consumer products or consumer product types.

As used herein, the term "active component" means a component of a consumer product that provides a desired benefit for the user.

As used herein, the term "diluent component" means a component of a consumer product that acts as a filler or non-active component. For example, in certain counterfeit products, a diluent component may be used to increase the apparent volume of the counterfeit product.

As used herein, the term "preservative component" means a component of a consumer product that may preserve the consumer product, thereby increasing the shelf-life of the product.

As used herein, the term "haircare product" includes, but is not limited to, shampoos, medicated shampoos, conditioners, styling and finishing products, hair treatment products, hair coloring products and the like.

As used herein, the term "skincare product" includes, but is not limited to, skin conditioners, skin moisturizers, lotions and creams, shower and bath gels, shaving products, anti-aging products, cosmetics, make-up removers, and the like.

As used herein, the term "fabric care product" includes, but is not limited to, powdered laundry detergents, liquid laundry detergents, heavy duty liquid laundry detergents, fabric conditioners, and the like.

As used herein, the term "dental care product" includes, but is not limited to, toothpastes and gels, mouthwashes, rinses, toothbrushes, and the like.

As used herein, the term "fine fragrance product" includes, but is not limited to, perfumes, colognes, scents, body sprays, aftershaves, and the like.

As used herein, the term "health care product" includes, but is not limited to, cough medicines, nasal decongestant rubs and sprays, and the like.

As used herein, the term "homecare product" includes, but is not limited to, air fresheners, surface and appliance cleaners, hand soaps, and the like.

As used herein, the term "cosmetics product" includes, but is not limited to, foundations, make-up, mascara, lipstick, and the like.

As used herein, the term "battery" includes, but is not limited to, rechargeable and non-rechargeable batteries, e.g., AA, AAA, C, D, and 9v batteries, and the like.

As used herein, the term "razor or razor blade product" includes, but is not limited to, disposable razors, blade cartridges, lubrication enhancing components or strips, blade metal alloys, and the like.

As used herein, the term "beverage product" includes, but is not limited to, consumer beverage products such as soft drinks, carbonated drinks, sports drinks, energy drinks, and the like.

As used herein, the term "yeast fermentation product" when used in reference to a skincare product includes a blend of vitamins, amino acids, minerals, and organic acids produced during the fermentation processes of a yeast organism.

As used herein, the term "test strips" includes testing devices such as a strip of paper, plastic, cloth, or some other medium on which a testing composition has been deposited. Upon exposure to a test sample, the testing composition may visibly or physically change to indicate the presence or absence of a substance or composition in the test sample.

As used herein, the term "test solution" includes a solution, suspension, or other composition composed of the consumer product to be tested or a solution, suspension, or other composition formed by reacting the consumer product being tested with one or more reactants to form a desired test solution.

As used herein, the term "portable" when used in reference to the kit means that the kit is readily moved from one location to another. For example, the kit may be packed in a container and carried from one test location to another test location, where it may be unpacked and used to test a consumer product. A portable kit may be carried by the user or users, or may require transportation using a vehicle such as an automobile or other transportation device.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Counterfeit Detection Kit

Various embodiments of the present disclosure provide for detection kits that may be used to test one or more consumer products to determine whether the product is authentic or counterfeit. The kits may be configured for use on-site at various facilities, such as, for example, at one or more of a customs warehouse, a retail outlet, a wholesale supply store, a manufacturing plant, a distributor, a shipping an receiving facility, a consumer's home, or any other location where a suspected counterfeit product may be found. The counterfeit detection kit allows for rapid and efficient on-site detection of counterfeit consumer products without the need for expensive analytical instrumentation, highly trained testing technicians, or complex experimental procedures.

According to one embodiment, the present disclosure provides a kit for detecting counterfeit consumer products. The kit may comprise at least one test protocol for detecting the presence of an active component in a consumer product, at least one test protocol for detecting the presence of a diluent component or a metal ion component in a consumer product, and at least one test protocol for detecting the presence of a preservative component in a consumer product. In other embodiments, the kit may comprise two or more test protocols for detecting the presence of an active component in a consumer product. In still other embodiments, the kit may comprise two or more test protocols for detecting the presence of a diluent component in a consumer product. In still other embodiments, the kit may comprise two or more test protocols for detecting the presence of a preservative component in a consumer product. In still other embodiments, the kit may comprise any combination of two or more test protocols for detecting the presence of an active component, a diluent component, and/or a preservative component in a consumer product.

The kits according to the various embodiments disclosed herein may be used by a trained technician, for example, a technician employed by a government or the consumer product manufacturer or, alternatively, the kit may be used by a custom official or other government official, for example at a port or entry or custom port, to test a suspected counterfeit consumer product. The testing protocols in the counterfeit detection kit are designed to be readily carried out by a user with minimal chemical or scientific knowledge or skill, for example, by an untrained person following a set of instructions on carrying out the testing protocol.

In specific embodiments, the kit for detecting counterfeit consumer products may further comprise instructions for using the test protocols for detecting the counterfeit consumer products. The instructions may take the form of a set of written instructions, pictorial instructions, audio instructions, video instructions, or various combinations of these instruction types. Typically, a set of instructions would contain instructions for performing the various test protocols in the kit, as well as details on the expected test results from an authentic consumer product and a counterfeit consumer product. In other embodiments, the user may be trained in the use of the various test protocols within the kit.

Specific embodiments of counterfeit detection kit and/or the instructions for the counterfeit detection kit may be tailored for a specific set of consumer products. For example, a company wishing to use the counterfeit detection kit to detect counterfeit versions of their product may develop a specific set of protocols targeted to detect counterfeiting with a selected set of consumer products. Alternatively, or in addition, the instructions may focus on test protocols for detecting counterfeit versions of only the company's products or a subset of those products (such as products which the company has found to be frequently the target of counterfeiters).

A variety of consumer products may be tested using the various test protocols within the kit. For example, consumer products such as, but not limited to, hair care products, skincare products, fabric care products, dental care products, fine fragrance products, health care products, homecare products, cosmetic products, batteries, beverage products, and razors or razor blade products are frequently subject to counterfeiting and may be tested using the test protocols within the kit. In certain embodiments, the kit may be configured to contain test protocols for counterfeit products from a single type of consumer product (i.e., hair care consumer products, skincare products, or fabric care products). In other embodiments, the kit may be configured to contain test protocols for counterfeit products from a variety of different types of consumer products. That is, in one non-limiting example, the kit may contain test protocols for hair care products, skincare products, fabric care products. In other embodiments, the kit may contain test protocols for various combinations of any of the consumer products types described herein or known in the art.

Test Protocols for Detection of the Presence of an Active Component

The specific test protocol used to determine the authenticity of the consumer product may depend, at least in part, of the specific consumer product being tested. For example, various authentic consumer products may rely on one or more active components that provide the product with the desired effect. Many counterfeit products may have reduced amounts of the active components and more generally, may lack the active component altogether. Thus, one approach for the various test protocols is to test for the presence (or absence) of an active component in the consumer product that is suspected of being counterfeit. Those products which lack the active component or the required amount of the active component will be counterfeit, whereas those products that test positive for the presence of the active product have a higher likelihood of authenticity. However, further testing should be carried out if the authenticity of the product is still in doubt.

According to various embodiments, the kit may comprise at least one test protocol for detecting the presence of an active component in the consumer product where the test protocol is selected from the group consisting of: a test protocol for detecting the presence of zinc pyrithione in a hair care product; a test protocol for detecting the presence of ammonium ions in a hair care product; a test protocol for detecting the presence of niacinamide in a skincare product; a test protocol for detecting the presence of a sunscreen agent in a skincare product; a test protocol for detecting the presence of a yeast fermentation product in a skincare product; a test protocol for detecting the presence of hydrogen peroxide in a fabric care product; a test protocol for detecting the presence of orthophosphate in a fabric care product; a test protocol for detecting the presence of a zeolite in a fabric care product; a test protocol for detecting the presence of a silicate in a fabric care product; a test protocol for detecting the presence of an enzyme in a fabric care product, a test protocol for detecting the presence of ethylenediaminetetraacetic acid in a bar soap product; a test protocol for detecting the presence of fluoride ion in a dental care product; and a test protocol for detecting the presence of a UV absorber in a fine fragrance product.

For example, an active component in many hair care products, such as shampoos, for the treatment of dandruff is the active ingredient, zinc pyrithione (which may be included in concentrations ranging from 0.5% w/w to 1.5% w/w or in certain embodiments about 1% w/w). For these products, in most countries, zinc pyrithione will be listed in the INCI (International Nomenclature of Cosmetic Ingredients) listing on the container (certain countries do not currently require listing of product ingredients on the container). To save on the expense, many counterfeit antidandruff shampoos may omit the zinc pyrithione active ingredient. A test that determines the presence of zinc pyrithione could be used to determine the authenticity of these hair care products. One test protocol for detecting the presence of zinc pyrithione involves addition of a solution of iron (III) chloride to a sample of the antidandruff product. Zinc pyrithione reacts with iron (III) chloride to product a dark blue/black color. Thus, an antidandruff hair care product which contains zinc pyrithione will give a positive color change to dark blue/black using this test protocol, whereas a counterfeit product that does not contain the zinc pyrithione will not display a color change.

For other hair care products, the test protocol may detect the presence of ammonium ions in an active component in a hair care product. Active components in certain shampoo products include ammonium surfactants. These are surfactants products which have an ammonium counterion ($NH_4^+$). Many hair care products may contain ammonium levels greater than 5000 parts per million (ppm). Ammonium surfactants can provide certain desired properties compared to surfactants with other counter cations. Since sodium surfactants are typically easier to source than ammonium surfactants, many counterfeiters will use sodium surfactants in counterfeits of hair care products that contain ammonium surfactants. Alternatively, if the authentic hair care product contains sodium surfactants, some counterfeiters have been known to substitute ammonium surfactants. Therefore, a test which detects the presence of ammonium cations may be used to determine if a product is counterfeit. By examining the INCI listing on the hair care product, it may be determined whether the authentic product contains ammonium surfactants, such as, for example, ammonium laureth sulfate or ammonium lauryl sulfate. A test protocol using sodium hydroxide and test strips that are sensitive to the presence of ammonium ions (such as, for example a MERCKOQUANT® ammonium test strip, commercially available from Merck Chemicals, which detects ammonium from 0 to 400 ppm) may be used to detect the presence of ammonium ions in the resulting solution (with an approximate 10× dilution, a hair care product with a 5000 ppm concentration of ammonium ion will have approximately 500 ppm ammonium ion in the solution, which will result in an off scale, dark orange, reading on the test strip). In those products which display one or more ammonium surfactants on the INCI listing, a negative test (i.e., less than 30 ppm ammonium ion detected) would indicate that the product is counterfeit. Likewise, in those products that do not include an ammonium surfactant (or other ammonium ion containing ingredient), a positive test (i.e., ammonium ion detected) would indicate that the product is likely to be counterfeit.

Niacinamide (pyridine-3-carboxamide, also known as nicotinamide) is the amide of niacin (vitamin $B_3$). Niacinamide may display anti-inflammatory actions and may be used to treat inflammatory skin conditions such as acne. Niacinamide may be added as an active ingredient in certain skincare products, such as skin creams, lotions and gels in amounts ranging from 0.5% to 3% w/w (5,000 ppm to 30,000 ppm), as an anti-acne ingredient; to reduce redness, irritation or dryness of skin; to combat skin ageing factors (strengthen skin's moisture barrier, reduce the appearance of fine lines and wrinkles, improve skin tone and texture and reduce appearance of hyper pigmented spots), and enhance skin health and appearance. Counterfeit versions of skincare products containing niacinamide will typically omit the niacinamide. Niacinamide will release ammonia when heated in the presence of sodium hydroxide. Therefore, one test protocol for the presence of niacinamide involves exposing the skincare product to sodium hydroxide, testing the cold solution for ammonia (using an ammonia test strip such as a MERCKOQUANT® ammonium test strip, commercially available from Merck Chemicals) and then heating the solution and testing the heated solution for ammonia (using an ammonia test strip at 10× product dilution, and looking for a dark orange color indicating greater than 60 mg/L of ammonia). Only products that test negative for ammonia in the cold test can be tested for niacinamide by this procedure. A product that should contain niacinamide and tests negative for the cold solution (indicating no ammonia compounds in the product) should test positive for the heated solution (indicating the presence of niacinamide). A product that lists niacinamide on the INCI listing but tests negative for niacinamide in the hot solution will likely be counterfeit.

Many skincare products, such as, but not limited to, skin creams and lotions, have an SPF ("Sun Protection Factor") factor rating and contain one or more sunscreen agents, as some of the active components. SPF sunscreens act by including a UV light absorber, such as UVA and UVB absorbers, to protect the consumer from exposure to harmful ultraviolet rays in sunlight. Counterfeit products may omit the SPF component. Products with an SPF of 15 or higher (and where the active SPF component is not zinc oxide) may be tested for the presence of the UV light absorber by examining the effect of UV light on an extract of the skincare product with fluorescein. One test protocol may comprise adding one drop of the suspected product to a vial, adding approximately 1 mL of a solution of 0.01% w/v of fluorescein in methanol, mixing the solution thoroughly, and exposing the mixed sample to UV light. Fluorescein is a compound which fluoresces when exposed to UV light. However, in the presence of most active sunscreen factors (SPF of 15 or higher), the UV light is absorbed by the sunscreen factor and the fluorescein does not fluoresce. A skincare product which contains an active SPF factor (not including zinc oxide) will show little (slight yellow glow) or no fluorescence (when the test solution is exposed to UV light whereas a test solution of a sample which contains no active SPF factor will brightly fluoresce (bright yellow green) when exposed to UV light. A skincare product that lists one or more common sunscreen agent on the INCI listing and which purports to provide an SPF of 15 or greater but tests negative for an SPF factor (i.e., fluorescein test solution brightly fluoresces) will likely be counterfeit.

Certain skincare products may include yeast fermentation products, such as, for example Pitera yeast ferments, in concentrations ranging from 5% to 90% w/w (for example certain SK-II brand skincare products, commercially available from Procter & Gamble Company, Cincinnati, Ohio). Pitera ferments comprise a blend of amino acids, vitamins, minerals and organic acids, as well as a significant amount of glucose. Glucose levels may be detected using commercially available glucose test strips (such as URISTIX® strips developed to measure glucose levels in urine, commercially available from Bayer). The test protocol may include placing a drop of the skincare product on the glucose test zone on a urine test strip, leaving the drop on the glucose zone for 2 minutes or more, removing the test sample from the strip, and comparing the glucose test zone with an unused strip to determine color change. In the presence of a skincare product with a high amount of Pitera, the glucose test zone should turn a pale blue or pale green color indicting the presence of glucose. The lack of a color change indicates no glucose and therefore, likely no Pitera or yeast fermentation in the product. Since Pitera or other yeast fermentation will likely be omitted from any counterfeit product, a negative test result (i.e., no color change observed) will indicate that the sample product may be counterfeit.

Certain fabric care products may comprise various active components that may be tested for using test protocols as described herein. For example, aqueous solutions of laundry detergent granules or other fabric care products may be tested for water hardness control chemicals (such as phosphates, orthophosphate, or tripolyphosphate, in 0.1% to 15% w/w), bleaches (such as peroxides in 0.1-10% w/w as the percarbonate), zeolites (in from 0.1% to 17% w/w), enzymes (approximately 100 ppm), and silicates ((in from 0.1% to 8% w/w) using test strips. The method for testing fabric care products for these active components may comprise weighing an amount of the test product, mixing with water or acid to make a solution, filtering the solution to remove any undissolved solids and then testing the resulting solution using, for example a phosphate test strip (MERCKOQUANT® phosphate test strip from Merck that can measure from 0 to 400 ppm phosphate), peroxide test strip (MERCKOQUANT® peroxide test strip from Merck that can measure from 0 to 100 ppm phosphate), aluminum zeolite test strip, or silicic acid test strip (MICROQUANT® silicic acid test solution from Merck that can measure from 0.6 ppm to 21 ppm silicic acid) as described further in the Examples section. The test strip will typically change color if the active compound is present so a negative test (no color change) will indicate the test product may be counterfeit.

Ethylenediaminetetraacetic acid (EDTA) and various salts thereof may be used either as an active component in certain consumer skincare products, such as, for example, soap, or may be used as a preservative component in other skincare products and hair care products, such as, lotions, creams, and shampoos and conditioners. EDTA (in concentrations ranging from 0.1% w/w to 0.25% w/w) may be an active component or a preservative component, since it may bind metal ions to aid in cleaning or prevent spoilage, respectively. For example, in certain soaps, EDTA may be included as an active component as a ligand to bind metal ions to solubilize them and remove them from the surface being cleaned. Alternatively, EDTA may be added to other consumer products prevent spoilage, for example, by binding to metal ions that can cause oxidation in the consumer product. Since EDTA is a metal binder, its presence may be detected by using a competing metal binder, such as dithizone. Dithizone binds with zinc ions ($Zn^{2+}$) resulting in a pink colored complex in an ethanol solution. In contrast, EDTA binds zinc ($Zn^{2+}$) in preference to dithizone to form a yellow or purple colored solution. One test protocol for detecting the presence of EDTA in a consumer product (except those products that also contain zinc pyrithione) may include adding a pink ethanolic solution of dithizone and $Zn^{2+}$ to an aqueous solution of the test product (can detect from 100 ppm to 250 ppm EDTA at 10× dilution level). If the test product does not contain EDTA, then the solution will remain pink (i.e., the color of the dithione/$Zn^{2+}$ complex), whereas if the product contains EDTA, the EDTA will bind preferentially to the $Zn^{2+}$ and the color of the solution will turn to yellow or purple. If the authentic product contains EDTA (for example, as shown on the INCI listing), then a negative test result (pink color remains) will indicate that the test product may be counterfeit.

Fluoride has been shown to reduce the incidence of tooth decay and is therefore a common active component in many dental care products, such as, but not limited to toothpastes, tooth polishes, mouthwashes and the like (typically in from 500 ppm to 1200 ppm). Fluoride ion may be omitted from certain counterfeit dental care products. Test protocols for fluoride ions in a dental care product may include those protocols that selectively and easily detect fluoride. One potential test protocol may utilize a fluoride test disk (commercially available from Macherey-Nagel GmbH & Co., Germany) for detecting fluoride containing hydrochloric acid solutions, and may involve making an aqueous solution of the dental care product, adding an HCl solution to the mixture, exposing the fluoride test disk to the acidic solution of the dental care product. According to certain embodiments, portions of the test disk will turn from a pink color to white if fluoride ion is present in the dental care product. If the INCI listing includes a fluoride salt or fluoride producing active component, then a negative test (i.e., no color change) may indicate that the dental care product is counterfeit.

Many fine fragrance products may include a UV absorber/sunscreen as an active component, for example to protect the product from exposure to UV radiation in sunlight. Examples of potential UV absorbers include, but are not limited to benzophenone-2 and UVINUL® A plus B (commercially available from BASF). Fine fragrance products that have a UV absorber (as shown by the INCI listing) will absorb UV radiation that is shone through them. Therefore, one test protocol may involve placing a small amount of a sample fine fragrance in a glass vial, placing the vial on a surface that fluoresces when exposed to UV radiation (such as a white sheet of paper, or in some embodiments, the surface of the instructions sheet with the kit), exposing the sample to UV radiation, and noting if the surface behind the sample fluoresces. If the surface glows as a result of UV radiation being transmitted through the test sample, then the sample does not contain the UV absorber and may be counterfeit.

Test Protocols for Detecting the Presence of a Diluent Component

Many counterfeiters may include a diluent component in the counterfeit product, for example to reduce the overall cost of the counterfeit product. For example, a counterfeiter may replace various active components or other components in the authentic product with a diluent to produce a counterfeit product that looks similar to or has a similar volume as the authentic product. However, these diluents will typically provide no desired properties to the product. Test protocols that test for many commonly used diluents may be developed to detect counterfeit products. In certain embodiments, the kit may comprise at least one test protocol for detecting the presence of a diluent component or metal ion component in the consumer product where the test protocol is selected from the group consisting of a test protocol for detecting the presence of chloride ion in a fabric care product; a test protocol for detecting the presence of high levels of sulfate ion in a fabric care product; and a test protocol for detecting the present of a specific metal ion in a hair care product, a skincare product, a fabric care product, a health care product, a homecare product, a cosmetics care product, a dental care product, a battery, or a razor or razor blade product.

Sodium chloride may be used by various counterfeiters as a diluent component to produce a counterfeit product that looks like and has a volume or bulk equal to an authentic counterpart. For example, sodium chloride may be used in a fabric care product, such as a powdered or granular fabric care product, for example a granular detergent product. Typically, even in products that may contain small amounts of sodium chloride, the counterfeit product may contain sodium chloride (or other chloride salts) in amounts far greater than the authentic product. One test protocol useful in the detection kits described herein may include a test protocol that can detect chloride ion concentrations of aqueous solutions in concentrations of greater than 3000 parts per million (ppm), or in other embodiments, greater than 1000 ppm (for example a MERCKOQUANT® chloride test strip which can quantify from 500 ppm to 3000 ppm chloride, commercially available from Merck). The test protocol would include making a test solution from the fabric care product by placing an amount of the test product in a vial, adding water to make a solution, filtering the solution to remove undissolved granules, and testing the solution with a chloride test strip to determine the chloride concentrations. Since many fabric care products designed for use in washing machines have a chloride content of less than 0.1% w/w, a positive test such as a reading of greater than 3000 ppm, or in some cases greater than 1000 ppm would indicate that the fabric care product may be counterfeit.

Another common diluent that is used by counterfeiters in counterfeit fabric care products, such as powder or granular products includes sodium sulfate. One test protocol that could detect the presence of sodium sulfate would involve testing an aqueous solution of the product with a sulfate test strip. While certain commercial fabric care products may contain sulfate concentrations from 20% to 70% w/w, counterfeit versions of these products may contain even higher levels. Depending on the test product, sulfate levels could be measured using commercially available sulfate test strips and the sulfate level compared to the expected sulfate levels. Those test products which included sulfate at levels substantially above what is contained in the authentic product would likely be counterfeit.

Test Protocols for Detecting the Presence of a Metal Ion Component

Many counterfeit products, such as hair care products, skincare products, fabric care products, health care products, homecare products, cosmetic products, batteries, or a razor or razor blade product, may have increased levels of various metal ions compared to the authentic products. For example, while the manufacture of authentic products are typically subject to stringent quality control/quality assurance protocols as well as various governmental and nongovernmental regulations and requirements (including protocols, regulations and requirements that limit the acceptable concentrations of many metals and metal ions in the commercial product); counterfeiters are not under similar constraints and the counterfeit products may contain increased levels of various specific metal ions compared to the authentic product. Other products, for example razor blades or other products, may include specific metals and alloys in the authentic product, which may not be present in the counterfeit product. Test protocols that can detect and/or quantify specific metal ions in aqueous solutions of test products may be used to determine the authenticity of the product. For example, high quality razor blades may include chromium or other metal alloys that may be omitted in the lower quality alloys used in counterfeit razor blades. Alternatively, certain battery brands may include specific metals or combinations of metals as part of the pigments in the battery label (for example, DURACELL® type batteries, commercially available from Procter & Gamble Co., Cincinnati, Ohio). A test protocol where the metal of a sample razor blade or battery is dissolved with acid then tested for the presence of specific metal ions could be used to determine the authenticity of the product. For other products, such as hair care products, skincare products, fabric care products, health care products, homecare products, and cosmetic products, may be tested to detect the presence of contaminating metal ions that are not present in the authentic product. If the product tests positive for those metal ions, then the product is likely counterfeit. Many commercially available test strips may be included in the kit and used to target specific metal ions that commonly occur in counterfeits of specific commercial products.

Test Protocols for Detecting the Presence of a Preservative Component

Many authentic products may contain one or more preservative components that may act to increase the shelf life of the consumer product. Since counterfeiters are not typically concerned about the shelf life of the products or the various components in the products, many counterfeit products will omit preservative components to reduce the cost of producing the counterfeit product. Therefore, test protocols that can detect the presence of various preservative components may be used to detect counterfeit products. According to other embodiments, the kit may comprise at least one test protocol for detecting the presence of a preservative component in the consumer product where the test protocol is selected from the group consisting of a test protocol for detecting the presence of a formaldehyde releasing agent in a hair care product, a skincare product, or a cosmetics product; a test protocol for detecting the presence of ethylenediaminetetraacetic acid, or salts thereof, such as disodium ethylenediaminetetraacetic acid, in a hair care product or a skincare product; a test protocol for detecting the presence of a benzoate in a hair care product or a skincare product; and a test protocol for detecting the present of parabens in a hair care product, a skincare product, or a cosmetics product.

The test protocols described herein may be effective for detecting the presence of one or more preservative components in a consumer product. Because counterfeiters have little interest in the quality or shelf life of the product they market, many counterfeit versions of consumer products will omit preservative components. Formaldehyde releasing agents, EDTA, benzoates, and parabens are several types of preservative components that may be omitted from various counterfeit consumer products.

Formaldehyde may be part of a preservative system for certain consumer products, such as hair care products, skincare products, or cosmetic products, and is produced in situ from the decomposition of compounds known as "formaldehyde releasing agents". These compounds release formaldehyde over time and the formaldehyde may act as a preservative component in consumer products to prevent bacterial induced spoilage. Examples of formaldehyde releasing agents include, but are not limited to, imidazolidinyl urea and DMDM hydantoin (1,3-dimethylol-5,5-dimethylhydantoin), which may be included in the consumer products in amounts ranging from 100 ppm to 500 ppm (as measured by released formaldehyde). In the presence of base, such as aqueous solutions of hydroxide bases, the formaldehyde releasing agents produce formaldehyde, which may be detected in the aqueous base solution using commercially available formaldehyde test strips (for example, MERCKOQUANT® formaldehyde test strips capable of measuring from 10 ppm to 100 ppm formaldehyde, commercially available from Merck).

Products which include a formaldehyde releasing agent as a preservative will cause the test pad on the test strip to change color from pink to dark purple, whereas in a product which does not contain the formaldehyde release agent, the strip will remain pink. A negative test result on a consumer product which lists a formaldehyde releasing agent-type preservative on the INCI listing will likely be counterfeit.

EDTA or various salts thereof is another preservative component that is commonly used in hair care products and skincare products. The EDTA is a chelator which may chelate to trace metal ions in the product and prevent catalytic oxidation by the metal and stabilize the product. The presence of an EDTA preservative agent in a consumer product may be detected using the test protocol described elsewhere herein. A negative test for EDTA in a consumer product that lists EDTA on its INCI listing indicates that the product is likely counterfeit.

Benzoic acid and its various benzoate salts, such as sodium salt and calcium salts, (collectively referred to herein as "benzoates") are used as a preservative component in various hair care and skincare products (in approximately 0.25% w/w). The benzoates may act to inhibit the growth of certain molds, yeasts, and bacteria. A test protocol that can detect the presence of one or more benzoates in a consumer product may be used to differentiate authentic products from counterfeit versions. One colorimetric test protocol may be described by Costero, et al., "A selective colorimetric chemodosimeter for the naked eye detection of benzoate anion," *Tetrahedron Letters,* 47, (2006), 6561-6564. A negative test for benzoates in a consumer product that lists one or more benzoate type preservative on its INCI listing indicates that the product is likely counterfeit.

Benzoates may also be found in consumer beverages, such as soft drinks, carbonated drinks, sports drinks, energy drinks, and the like. The test protocols described herein may be used to detect the presence of benzoates in these consumer drinks. Certain embodiments of these consumer drinks may also contain orthophosphate, for example to control the acidity of the drink. Certain counterfeit drinks products may not contain the orthophosphate as contained in the authentic drink product. The test protocols described herein for detecting the presence of phosphates, such as phosphate test strips (MERCKOQUANT® phosphate test strip from Merck that can measure from 0 to 400 ppm phosphate) may also be used to detect the presence of orthophosphate in consumer beverage products.

Parabens (esters of 4-hydroxybenzoic acid, such as methyl 4-hydroxybenzoic acid (methyl paraben), ethyl 4-hydroxybenzoic acid (ethyl paraben), propyl 4-hydroxybenzoic acid (propyl paraben), 1-methylethyl 4-hydroxybenzoic acid (isopropyl paraben), butyl 4-hydroxybenzoic acid (butyl paraben), 2-methylpropyl 4-hydroxybenzoic acid (isobutyl paraben), benzyl 4-hydroxybenzoic acid (benzyl paraben), and the like) may be used as a preservative component in certain consumer products, such as hair care products, skincare products, and cosmetic products. Parabens display bacteriocidal and fungicidal properties and may be used in various consumer products in amounts ranging from 0.1% to 0.3% w/w. The phenol hydroxide functional group may be used in test protocols to detect the presence of parabens in a consumer product. One test protocol may include a commercially available phenol test protocol, for example, SPECTROQUANT® phenol cell test, commercially available from Merck KGaA, Germany, capable of detecting less than 10 ppm phenol. According to this test protocol, the consumer product is dispersed in water (20× dilution) in a vial, a first test reagent (Ph-1K, two scoops) is added to the test solution and the vial shaken, and a second test reagent (Ph-2K, two scoops) is added to the test solution and the vial shaken. If the consumer product contains a paraben preservative, the solution will turn orange in color, whereas if there is no parabens preservative, the solution will remain a pale yellow. A negative test for paraben in a consumer product that lists one or more paraben preservative on its INCI listing indicates that the product is likely counterfeit.

Instructions

According to certain embodiments, the kit for detecting counterfeit consumer products may comprise a set of instructions, such as described herein, and two or more test protocols. For example, the kit may comprise two or more test protocols selected from the group consisting of one or more test protocols for detecting a counterfeit hair care product, one or more test protocols for detecting a counterfeit skincare product, and one or more test protocols for detecting a counterfeit fabric care product; as described herein. Specific embodiments of the kit may further include one or more additional test protocols described herein, such as one or more test protocols for detecting a counterfeit fine fragrance product, one or more test protocols for detecting a counterfeit dental care product, one or more test protocols for detecting a counterfeit health care product, one or more test protocols for detecting a counterfeit homecare product, one or more test protocols for detecting a counterfeit cosmetics product, one or more test protocols for detecting a counterfeit battery, and one or more test protocols for detecting a counterfeit razor or razor blade product.

In specific embodiments, the kit may be targeted to a specific type of consumer product. For example in one embodiment, the kit may be configured to detect counterfeit hair care products and comprise two or more test protocols for detecting the counterfeit hair care products. The hair care products to be tested according to this embodiment of the kit may be selected from the group consisting of a test protocol for detecting the presence of zinc pyrithione as an active component, a test protocol for detecting the presence of ammonium ions as an active component, a test protocol for detecting the presence of a specific metal ion as a diluent component, a test protocol for detecting the presence of a formaldehyde releasing agent preservative component, a test protocol for detecting the presence of EDTA as a preservative component, a test protocol for detecting the presence of a benzoate preservative component and a test protocol for detecting the presence of a paraben preservative component. Non-limiting examples of these test protocols are described herein.

In another embodiment, the kit may be configured to detect counterfeit skincare products and comprise two or more test protocols for detecting the counterfeit skincare products. The skincare products to be tested according to this embodiment of the kit may be selected from the group consisting of a test protocol for detecting the presence of niacinamide as an active component, a test protocol for detecting the presence of sunscreen agent as an active component, a test protocol for detecting the presence of a yeast fermentation product as an active agent, a test protocol for detecting the presence of a specific metal ion as a diluent component, a test protocol for detecting the presence of a formaldehyde releasing agent preservative component, a test protocol for detecting the presence of EDTA as an active component or preservative component, a test protocol for detecting the presence of a benzoate preservative component and a test protocol for detecting the presence of a paraben preservative component. Non-limiting examples of these test protocols are described herein.

In another embodiment, the kit may be configured to detect counterfeit fabric care products and comprise two or more test protocols for detecting the counterfeit fabric care products. The fabric care products to be tested according to this embodiment of the kit may be selected from the group consisting of a test protocol for detecting the presence of a peroxide as an active component, a test protocol for detecting the presence of orthophosphate as an active component, a test protocol for detecting the presence of a silicate as an active agent, a test protocol for detecting the presence of an enzyme as an active component, a test protocol for detecting the presence of chloride ion as a diluent component, a test protocol for detecting the presence of sulfate ion as a diluent component, and a test protocol for detecting the presence of a specific metal ion as a diluent component. Non-limiting examples of these test protocols are described herein.

The kit according to the various embodiments described herein may be configured as a portable counterfeit detection kit. For example, the kit may be configured to be readily transported and used on-site is various locations where the consumer products may be located, such as, but not limited to, a customs warehouse, a retail outlet, a wholesale supply store, a manufacturing plant, a distributor, a consumer's home, or a shipping and receiving facility. Portability may be important since it allows the test protocols to be used on products while they are in the stream of commerce (i.e., on-site), rather than requiring one or more samples of the consumer products be brought to a laboratory or analytical testing facility. This may allow for a more rapid classification and isolation/seizure of counterfeit products. Further, portability of the kit allows more readily for random testing of consumer products at the on-site locations described herein.

According to specific embodiments of the counterfeit detection kit, at least one of the test protocols may comprise one or more test strips or test solutions for detecting a concentration of one or more specific components of a counterfeit or authentic consumer product. For example, several of the test protocols described herein include test strips designed to test for the presence of a component that should be present in the authentic product or a component that may be commonly used by counterfeiters to "bulk up" the counterfeit product. The test strips or test solutions may be commercially available or may be proprietary. For those embodiments where the kit is portable, test strips and test solutions may be used since they require minimal space and the solutions and/or multiple test strips may be used to test multiple samples of the test products.

In certain embodiments, the kit may be configured such that the at least one test protocol may be applied to one or more different tested consumer products and the results compared to the results from an authentic consumer product. In specific embodiments, it may be desirable to include samples of specific authentic consumer products in the test kit such that the user may perform the various test protocols on the authentic consumer product and compare the results to the results from the sample of the consumer product that may be counterfeit. This may be particularly desirable with test protocols where the results from the tested consumer product may not be clear unless compared to an authentic product. In specific embodiments, specific brands of authentic consumer products may be used as a control for the tested product of the same brand (i.e., the test results from a control sample of brand X product may be directly compared to the test results from the test sample of the consumer product that is purportedly brand X).

The present disclosure also provides for methods for detecting one or more counterfeit consumer products, such as any of the consumer product-types described herein. For example, in one embodiment the present disclosure provides a method for detecting a counterfeit consumer product comprising the steps: selecting one or more consumer products for testing, selecting the appropriate test protocol from a kit for detecting counterfeit consumer products, testing the consumer product with the test protocol, and analyzing results from the test protocol to determine whether the consumer product is counterfeit or authentic. According to these embodiments, the kit for detecting counterfeit consumer products may be a kit according to any of the various embodiments described herein. In one embodiment, the kit may comprise at least one test protocol for detecting the presence of an active component in the consumer product, at least one test protocol for detecting the presence of a diluent component in the consumer product, and at least one test protocol for detecting the presence of a preservative component in the consumer product.

The consumer product may be any of the consumer products described herein, such as, for example, a haircare product, a skin care product, a fabric care product, a dental care product, a fine fragrance product, a health care product, a homecare product, a cosmetics product, a battery, a beverage product, or a razor or razor blade product. In various embodiments, the consumer product may be part of an import or export shipment, such as a shipment in a customs port. According to specific embodiment, specific products (i.e., one manufacturer's products or one type or class of consumer products) may be targeted for testing, for example in cases where one manufacturer desires to address counterfeiting of their products, which may be specific types of products (i.e., haircare products or skin care products or fabric care products).

According to certain embodiments of these methods, analyzing the results of the test protocols to determine whether the consumer product is counterfeit or authentic may comprise comparing the test results against a control test. For example, as discussed herein, the user may also conduct the test protocol on a known authentic sample of the consumer product as a control and compare the results from the control with the results from the consumer product selected for testing. In other embodiments, the counterfeit detection kit may also include detailed instructions describing a positive test result for each of the various test protocols included in the kit. These instructions may include pictorial or colorimetric examples of positive and negative results from one or more of the test protocols.

In certain embodiments, the step of selecting an appropriate test protocol from the kit may comprise analyzing the INCI listing or other ingredient listing (such as one provided by a manufacturer) to determine whether the consumer good has an active component or preservative component appropriate for testing. For example, for a haircare product, the INCI listing may indicate that the authentic product may contain ammonium based surfactants as an active component and DMDM hydantoin as a formaldehyde releasing preservative component. In this case, an appropriate test protocol may be either the test protocols for detecting the presence of ammonium ions or the test protocol for detecting the presence of a formaldehyde releasing agent. In other embodiments, counterfeit products may frequently have specific diluents which may be tested for using the test protocols in the kit. For example, when the consumer product is a powdered or granular laundry detergent, selecting the appropriate test protocol may comprise selecting a test protocol for detecting the presence of various diluent components (such as chloride ion, sulfate ion, or trace metal ions) that may typically be found in counterfeit fabric care products.

According to other embodiments, the methods may further comprise selecting one or more additional appropriate test protocols from the kit for detecting counterfeit consumer products and performing additional tests on the consumer product with the additional test protocols. For example, for the haircare product where the INCI listing indicates that the authentic product contains ammonium based surfactants as an active component and DMDM hydantoin as a formaldehyde releasing preservative component, the user may test the product with for the presence of both ammonium surfactants and the formaldehyde releasing agent. An authentic product should provide positive results from both tests, whereas a counterfeit product will likely give a negative result for at least one of the multiple test protocols. In those embodiments where the testing gives mixed results, the test product may be subjected to more accurate analytical tests in an analytical laboratory to determine whether it is authentic or counterfeit. When combinations of two or more test protocols are used on a specific consumer product, the accuracy of detecting a counterfeit product may increase. In specific embodiments, the use of a combination of test protocols from the kit may allow for the detection of greater than 90% of counterfeit products and in certain embodiments greater than 95% of counterfeit products.

Still other embodiments of the present disclosure provide for methods of producing a kit for detecting counterfeit consumer products. According to certain embodiments, the methods may comprise the steps: selecting a set of test protocols for detecting counterfeit consumer products, configuring the set of test protocols in a kit for detecting counterfeit consumer products, and providing instructions for using the test protocols to detect the counterfeit consumer products. The set of test protocols may be selected according to any of the various embodiments of the counterfeit detection kits described herein. For example, according to one embodiment, the test protocols may comprise at least one test protocol for detecting the presence of an active component in a consumer product, at least one test protocol for detecting the presence of a diluent component in a consumer product, and at least one test protocol for detecting the presence of a preservative component in a consumer product. Other embodiments of the set of test protocols may be selected to target one specific type of consumer product (i.e., hair care product or skincare product or fabric care product), or may be selected to target products manufactured by a specific manufacturer.

In specific embodiments, the kit for detecting counterfeit consumer products may be configured as a portable counterfeit detection kit. For example, as described herein, in specific embodiments the kit may be configured so that the test protocols therein may be used on-site (i.e., at a testing site where the consumer goods are located) at a variety of testing sites. These embodiments may be require that the kit be portable, so that it may be readily transported to one or more on-site locations where the test protocols will be performed. Thus, the kit may be configured in a briefcase or suitcase type container which is sufficiently large enough to contain the various test protocols of the kit. Other embodiments of the kit may be configured so that the kit may be located at a single on-site facility, so that consumer products located at that site may be readily tested. According to this embodiment, the kit need not be readily portable since the kit will not be frequently transported from site to site.

According to the various embodiments, providing instructions for using the test protocols to detect counterfeit consumer products may comprise placing instructions within the kit, wherein the instructions for using the test protocols are in a form selected from the group consisting of written instructions, pictorial instructions, audio instructions, video instructions, and combinations of any thereof. The instructions may be configured so that unskilled users (such as, but not limited to, custom agents, other governmental agents, or local agents of a manufacturer) may readily use the test protocols within the kit to test a variety of consumer products, while referring to the instructions. For example, the instructions may include step-by-step procedures for conducting the various test protocols within the kit on a variety of consumer product types. Further, the instructions may include examples of a positive result from a test protocol and a negative result from a test protocol (such as pictures or video of a positive and/or negative result). In other embodiments, providing instructions for using the test protocols may comprise training a user of the kit on the use of the test protocols. According to these embodiments, the user or users of the kit may attend one or more training sessions to learn how to use the various test protocols within the kit. The one or more training sessions may include training the user on the use of each test protocol within the kit, and may include using the test protocol(s) on authentic and counterfeit consumer products so that the user can identify a positive and negative test result.

Certain test protocols reference specific commercially available test strips and reagents. However, one skilled in the art will understand that other suitable test strips and reagents may be commercially available and may be substituted for the noted test strips without departing from the intent of the invention. While various specific embodiments have been described in detail herein, the present disclosure is intended to cover various different combinations of the disclosed embodiments and is not limited to those specific embodiments described herein. The various embodiments of the present disclosure may be better understood when read in conjunction with the following representative examples. The following representative examples are included for purposes of illustration and not limitation.

EXAMPLES

Example 1

Test Protocol for Fine Fragrance Product

In this Example, a test protocol for detecting the presence of a UV absorber in a fine fragrance product is described. First, the INCI listing or other listing of the ingredient components for the product should be examined to determine if the product contains a UV absorber, such as benzophenone-2 or UVINUL® A plus B. UV absorbers may be added to the authentic product to protect the product from exposure to sunlight. The presence of these materials may be detected by using a UV lamp and a surface that fluoresces under UV light. If the product contains a UV absorber, then the following test protocol may be performed on a sample of the product to determine whether the product is authentic or counterfeit. This test protocol is only effective if the authentic product contains a UV absorber ingredient.

Amount of the fine fragrance product (approximately 0.5 mL) is to be added to an empty glass vial (the vial should be transparent to UV light). The vial containing the sample is placed on a surface that fluoresces and UV radiation from a UV lamp is shone through the sample. If the fluorescent surface can be seen to glow through the fragrance sample, then the sample does not contain a UV absorber and is therefore counterfeit. If the UV light is absorbed by the sample (i.e., the fluorescent surface does not fluoresce behind the sample), then the sample contains a UV absorber and may be authentic. A pair of reference samples may be included with the kit and may be referred to for comparing the appearance of a positive (UV absorber included in sample) or negative (no UV absorber included in sample) result. Examples of a positive and negative result are displayed in FIG. 1.

Example 2

Test Protocol for SPF Factor in Skincare Product

In this Example, a test protocol for detecting the presence of an SPF factor (sunscreen agent) in a skincare product is described. First, the label must be examined to determine if the skincare product has an SPF factor of 15 or higher. In addition, the INCI listing or other listing of the ingredient components for the product should not list the presence of zinc oxide based sunscreen agents. Skincare products having an SPF of 15 or more will contain a UV absorber to protect the consumer from exposure to harmful radiation. These materials are tested for by examining the effect of shining UV radiation on an extract of the sample.

Figure 2:
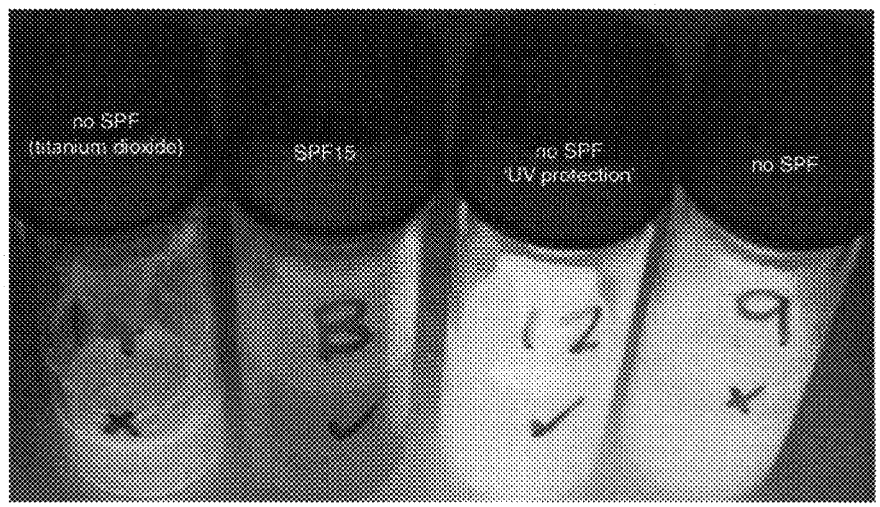
FIG. 2 an illustration of positive and negative results of the test kit for SPF factor in skin care products.

To a clean vial is added one drop of the skincare product to be tested. Approximately 1 mL (20 drops) of a 0.01% w/v solution of fluorescein in methanol is added to the vial, the vial capped and shaken to fully disperse the sample skincare product. UV radiation is shone on the sample solution in the vial. A product solution that shows little or no fluorescence (yellow glow) under UV radiation contains a UV absorber and may be authentic, whereas a sample that fluoresces brightly will contain no UV absorber and is therefore counterfeit. Reference samples may be included with the kit and may be referred to for comparing the appearance of a positive (UV absorber included in sample) or negative (no UV absorber included in sample) result. Counterfeit materials that contain certain materials (such as titanium dioxide) display a dim glow under the test protocol. Examples of positive and negative results are displayed in FIG. 2.

Example 3

Test Protocol for Zinc Pyrithione in Hair Care Product

In this Example, a test protocol for detecting the presence of zinc pyrithione in an antidandruff hair care product is described. First, the INCI listing or other listing of the ingredient components for the product should be examined to determine if the product contains zinc pyrithione, the active component in many antidandruff shampoos. The presence of zinc pyrithione may be tested for using an aqueous iron (III) solution.

Figure 3:
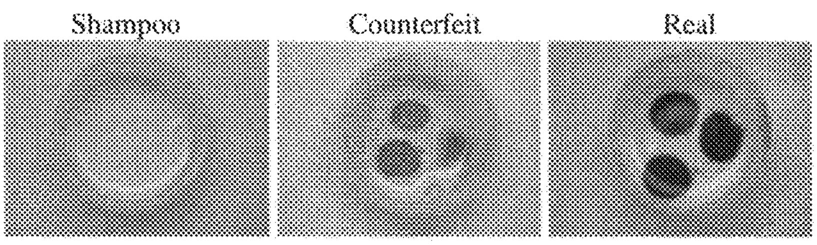
FIG. 3 an illustration of positive and negative results of the test kit for zinc pyrithione in hair care products.

A test solution of iron (III) chloride (1% w/v in water) may be included in the kit and used in this test protocol. Approximately 2 mL of the sample hair care product is placed in a clean vial. Two drops of the 1% w/v iron (III) chloride solution is placed in the vial in contact with the product sample and the mixture allowed to stand for several minutes. The solution/sample will turn a blue/black color if zinc pyrithione is present in the hair care product to indicate an authentic sample. If the color of the solution/sample does not change to a dark blue/black then the sample does not contain zinc pyrithione and is counterfeit. Reference samples may be included in the kit for comparison purposes. Examples of positive and negative results are displayed in FIG. 3.

Example 4

Test Protocol for Fluoride in Dental Care Product

In this Example, a test protocol for detecting the presence of fluoride ion in a toothpaste product is described. The test may also work for products containing monofluoro phosphate. First, the INCI listing or other listing of the ingredient components for the toothpaste should be examined to determine if the product contains fluoride, the active component in many types of toothpaste.

Figure 4:
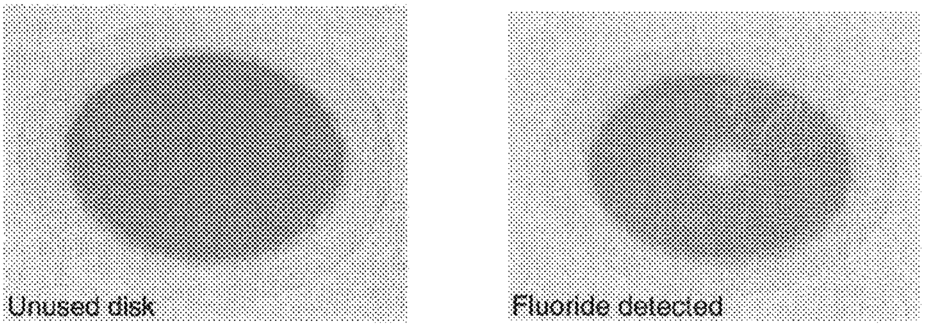
FIG. 4 an illustration of an unused disk and a positive result of the test kit for fluoride in dental care products.

An approximately 15 mm line of toothpaste is placed in the bottom of a clean sample beaker. The beaker is filled with approximately 15 mL of water and the solution stirred to disperse the toothpaste. A 6% v/v solution of hydrochloric acid (20 drops) is added to the solution with stirring. The center of a fluoride test disk (commercially available from Macherey-Nagel GmbH & Co., Germany) is pierced in the middle with a pin and the disk is completely immersed in the test solution for 5-7 min. If fluoride ion is present in the toothpaste, a bleaching effect should be apparent around the pierced section of the disk. If no bleaching effect is observed then the sample does not contain fluoride and the toothpaste is likely to be counterfeit. An example of an unused disk and a positive result (fluoride detected) are displayed in FIG. 4.

Example 5

Test Protocol for Ammonium Ion in Hair Care Product

In this Example, a test protocol for detecting the presence of ammonium cation in a hair care product is described. First, the INCI listing or other listing of the ingredient components for the hair care product should be examined to determine if the product contains ammonium surfactants, such as ammonium laureth sulfate or ammonium lauryl sulfate, or sodium surfactants, such as sodium lauryl sulfate. A product that lists an ammonium surfactant will test positive for ammonium ion and a product that only contains sodium surfactants will test negative for ammonium ion.

Figure 5:
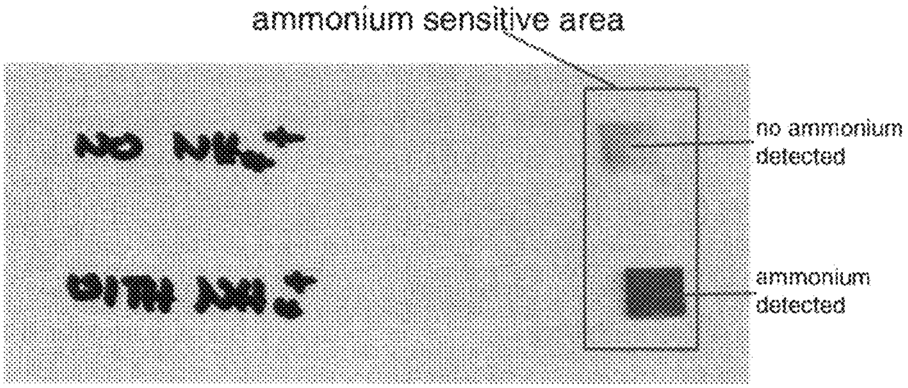
FIG. 5 an illustration of positive and negative results of the test kit for ammonium ion in hair care products.

One drop of the hair care product is place in a clean vial. Water (2 mL) and 10 drops of a concentrated aqueous solution of NaOH (27% w/v) are added to the vial, the vial capped and shaken to disperse the sample in the solution. An ammonium test strip (MERCKOQUANT® ammonium test strip, commercially available from Merck Chemicals) is dipped into the solution for 3 seconds and then removed and inspected after an additional 10 sec. If the product contains ammonium surfactants, the ammonium sensitive area of the test strip should change from yellow to dark orange/brown in color, whereas if no ammonium is detected there should be no color change. Depending on whether the product is listed as containing ammonium surfactants, it can be determined if the product is authentic or counterfeit. Examples of positive and negative results are displayed in FIG. 5.

Example 6

Test Protocol for Niacinamide in Skincare Product

In this Example, a test protocol for detecting the presence of niacinamide in a skincare product is described. First, the INCI listing or other listing of the ingredient components for the skincare product should be examined to determine if the product contains niacinamide (also called nicotinamide), an active component in some skincare lotions and creams. Niacinamide will produce ammonia when heated in the presence of sodium hydroxide.

Figure 6:
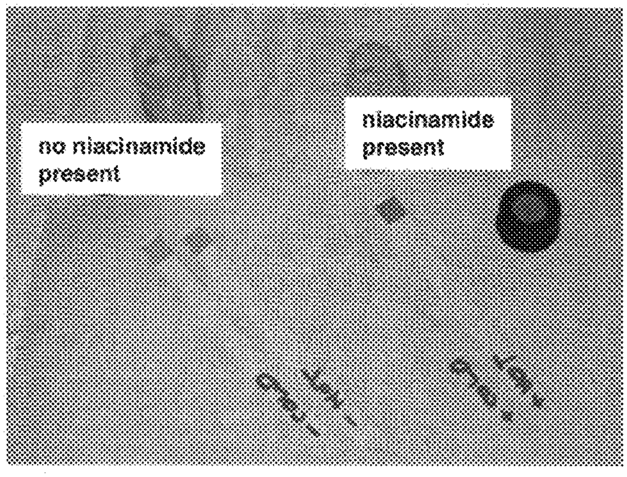
FIG. 6 an illustration of positive and negative results for niacinamide in skin care products.

One drop of the sample skincare product is placed in a clean vial. Water (2 mL) and 10 drops of a concentrated aqueous solution of NaOH (27% w/v) are added to the vial, the vial capped and shaken to disperse the sample in the solution. An ammonium test strip (MERCKOQUANT® ammonium test strip, commercially available from Merck Chemicals) is dipped into the solution for 3 seconds and then removed and inspected after an additional 10 sec. Little color change should be observed since niacinamide does not readily react with NaOH at room temperature. The sealed vial is placed upright in hot water (close to boiling, approximately 90° C. to 99° C.) for about 2 min. The vial is removed and a second ammonium test strip is dipped into the solution for 3 seconds and then removed and inspected after an additional 10 sec. Only products that test negative for ammonia in the cold test can be tested for niacinamide by this protocol. Comparing the cold and hot test strips, in a product that contains niacinamide the ammonium sensitive area of the hot test strip should change from yellow to dark orange/brown in color. If no color change is observed in the hot test strip, then the product is likely to be counterfeit. Examples of positive and negative results are displayed in FIG. 6.

Example 7

Test Protocol for EDTA in Hair Care and Skincare Product

In this Example, a test protocol for detecting the presence of EDTA in a hair care or skincare product is described. First, the INCI listing or other listing of the ingredient components for the product should be examined to determine if the product contains EDTA, a preservative component in some skincare lotions and creams. EDTA will compete with dithizone to bind with zinc to form different colored complexes.

A pink colored dithizone-zinc reagent is prepared by mixing a solution of 5 mg dithizone in 10 mL ethanol with a 20 mL of an ethanolic solution containing 10 ppm zinc sulfate heptahydrate. The test sample (0.1 g) is weighed and placed into a clean vial. Water (10× mass of product, 1.0 g, 1.0 mL) is added to the vial, the vial capped and shaken to disperse the sample. A 0.25 mL aliquot of the sample solution is placed into a clean vial and an equal volume of the dithizone-zinc reagent solution (0.25 mL) is added with swirling. The color of the resulting solution is inspected. If the product contains EDTA, the sample solution will change to a yellow color, whereas if the sample does not have EDTA the sample solution will remain pink. Sample solutions of consumer products that list EDTA on the ingredients but which do not change from the pink color do not contain EDTA and are likely to be counterfeit.

Example 8

Test Protocol for Formaldehyde Releasing Agent in Hair Care, Skincare, and Cosmetic Product In this Example, a test protocol for detecting the presence of a formaldehyde releasing agent in a hair care, skincare product, or cosmetic product is described. First, the INCI listing or other listing of the ingredient components for the product should be examined to determine if the product contains a formaldehyde releasing agent, such as DMDM hydantoin or imidazolindinyl urea, a preservative component in some hair care, skincare, and cosmetic products. DMDM hydantoin and imidazolindinyl urea release formaldehyde in situ upon decomposition.

The test product (0.5 g) is weighed and placed in a clean vial. Water (1 mL) is added to the test product and the vial capped and shaken or stirred. The test protocol utilizes a commercially available formaldehyde test strip kit (MERCKOQUANT® formaldehyde test strips capable of measuring from 10 ppm to 100 ppm formaldehyde, commercially available from Merck). Ten drops of the reagent that comes with the commercial test protocol ("Fo-1") are added to the sample solution and the sample shaken or stirred. A formaldehyde test strip is dipped into the test solution for several seconds, removed and gently dabbed to remove excess test solution. The test strip is allowed to react for two minutes and the color of the pad is inspected. The pad from a sample containing a formaldehyde releasing agent will turn from pink to purple, whereas a sample that does not contain the formaldehyde releasing agent will remain pink.

Example 9

Test Protocol for Parabens in Hair Care, Skincare, and Cosmetic Product

In this Example, a test protocol for detecting the presence of one or more paraben in a hair care, skincare product, or cosmetic product is described. First, the INCI listing or other listing of the ingredient components for the product should be examined to determine if the product contains a paraben, a preservative component in some hair care, skincare, and cosmetic products.

Figure 7:
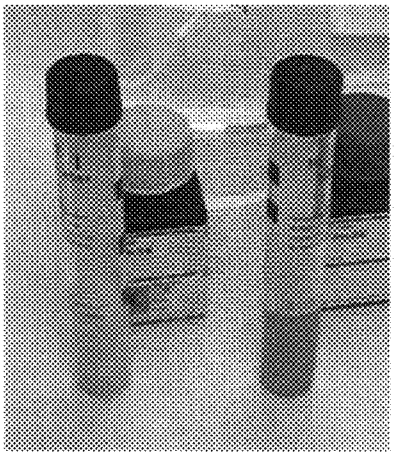
FIG. 7 an illustration of positive and negative results of the test kit for parabens in hair hare, skin care, and cosmetic products.

A commercially available test protocol for detecting phenols (SPECTROQUANT® phenol cell test, commercially available from Merck KGaA, Germany) is used to detect the presence of parabens in a consumer sample. Two drops of the test sample are measured into a clean pre-prepared vial from the SPECTROQUANT® test protocol and enough water is added to reach the lower edge of the label of the vial. The solution is mixed to disperse the test sample. Two level scoops (using scoop provided with test) of reagent Ph-1k are added to the vial and the vial capped and shaken for 10 sec. Two level scoops of reagent Ph-2K are added to the vial and the vial capped and shaken for 10 sec. The color of the solution is immediately inspected. Samples that contain parabens will change to an orange color, whereas samples that do not contain parabens will have a yellow color. Sample colors may change over time. Samples that should contain paraben (listed on INCI listing) but have a negative result from the test protocol are likely to be counterfeit. Examples of positive and negative results are displayed in FIG. 7.

Example 10

Test Protocol for Yeast Fermentation Product in Skincare Product

In this Example, a test protocol for detecting the presence of a yeast fermentation product in a skincare product is described. Certain SK-II Products (commercially available from the Procter & Gamble Company, Cincinnati, Ohio) are commercial skincare products containing Pitera yeast ferment ingredient. Glucose is a component of the yeast ferment and may be tested for with the following protocol using test strips for detecting/measuring glucose in urine.

One drop of the product to be tested is placed on the glucose test zone of a URISTIX® urine test strip (commercially available from Bayer) and the sample left for two minutes. Excess sample is wiped off the test strip and the color of the glucose test zone is inspected. A color change from pale blue to pale green indicates the presence of glucose. An authentic product should display the color change, whereas the glucose test zone will remain unchanged for a counterfeit product. The color change may be subtle so it may be necessary to compare the sample glucose test zone to one on an unused test strip.

Example 11

Test Protocol for Various Components in Fabric Care Product

In this Example, a test protocols for detecting the presence of various active and diluent components in a fabric care product are described. The test protocols include tests for phosphate and peroxide active components and chloride diluent component in a granular laundry detergent. The authentic product will test positive for phosphate and peroxide active components, if those components are part of the ingredient listing. A counterfeit product may not include these active components and instead, may contain sodium chloride as a diluent to bulk up the detergent.

Approximately 1 g of the sample laundry detergent is measured into a vial and water (10 g) is added. The solution is shaken to thoroughly mix and then filtered using a 0.45 μm filter membrane to remove any undissolved product and collected in a clean vial. This sample solution is used in the subsequent test protocols Phosphate Test Protocol: A MERCKOQUANT® phosphate test strip (commercially available from Merck) is utilized in this test protocol. The test strip is dipped into the sample solution, removed and the excess liquid allowed to drain by touching the edge of the strip to a paper towel. One drop of reagent $PO_4$-1 from the MERCKOQUANT® protocol is added to the test pad at the end of the strip, allowed to react for 15 seconds, and removed by touching the edge of the strip to a paper towel. The test strip is allowed to react for an additional 1 min. then inspected for a color change. Products containing phosphate will result in the pad changing from pale yellow to grey/dark green.

Peroxide Test Protocol: A MERCKOQUANT® peroxide test strip (commercially available from Merck) is utilized in this test protocol. The test strip is dipped into the sample solution, removed and the excess liquid allowed to drain by touching the edge of the strip to a paper towel. The test strip is allowed to react for an additional 10 sec. then inspected for a color change. Products containing peroxide result in the pad changing from a white to blue.

Chloride Test Protocol: A MERCKOQUANT® chloride test strip which can quantify from 500 ppm to 3000 ppm chloride (commercially available from Merck) is utilized in this test protocol. The test strip is dipped into the sample solution (all test pads submerged into the solution), removed and the excess liquid allowed to drain by touching the edge of the strip to a paper towel. The test strip is allowed to react for an additional 10 sec. then inspected for color change. Products containing chloride will cause the pads to change from brown to pale yellow (more pads turning yellow indicates a greater concentration of chloride).

Authentic samples of laundry detergent for automatic washing machines should give a positive test for at least one of the phosphate, peroxide, or silicate tests and should test negative for chloride ion. Counterfeit laundry detergents will likely give at least one negative test for phosphate, peroxide, or silicate, and may test positive for chloride.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A chemical test kit for detecting counterfeit consumer products consisting of:

at least one test protocol for detecting the presence of an active component in a consumer product;

at least one test protocol for detecting the presence of a diluent component or a metal ion component in a consumer product, the protocol comprising chlorine test strips; and at least one test protocol for detecting the presence of a preservative component in a consumer product, the protocol comprising a formaldehyde releasing agent and formaldehyde test strips.

2. The kit of claim 1, further comprising instructions for using the test protocols to detect counterfeit consumer products.

3. The kit of claim 2, wherein the instructions are in a form selected from the group consisting of written instructions, pictorial instructions, audio instructions, video instruction, and combinations of any thereof.

4. The kit of claim 1, wherein the consumer product is selected from the group consisting of a haircare product, a skincare product, a fabric care product, a dental care product, a fine fragrance product, a health care product, a homecare product, a cosmetics product, a battery, a razor or razor blade product, a beverage product, and various combinations of any thereof.

5. The kit of claim 1, wherein the at least one test protocol for detecting the presence of an active component is selected from the group consisting of a test protocol for detecting the presence of zinc pyrithione in a haircare product; a test protocol for detecting the presence of ammonium ions in a haircare product; a test protocol for detecting the presence of niacinamide in a skincare product; a test protocol for detecting the presence of a sunscreen agent in a skincare product; a test protocol for detecting the presence of glucose in a yeast fermentation product in a skincare product; a test protocol for detecting the presence of hydrogen peroxide in a fabric care product; a test protocol for detecting the presence of orthophosphate in a fabric care product or a beverage product; a test protocol for detecting the presence of a zeolite in a fabric care product; a test protocol for detecting the presence of a silicate in a fabric care product; a test protocol for detecting the presence of an enzyme in a fabric care product; a test protocol for detecting the presence of ethylenediaminetetraacetic acid in a bar soap product; a test protocol for detecting the presence of fluoride ion in a dental care product; and a test protocol for detecting the presence of a UV absorber in a fine fragrance product.

6. The kit of claim 1, wherein the at least one test protocol for detecting the presence of a diluent component or metal ion component is selected from the group consisting of a test protocol for detecting the presence of chloride ion in a fabric care product; a test protocol for detecting the presence of high levels of sulfate ion in a fabric care product; and a test protocol for detecting the presence of a specific metal ion in a haircare product, a skincare product, a fabric care product, a health care product, a homecare product, a cosmetics product, a battery, or a razor or razor blade product.

7. The kit of claim 6, wherein the test protocol for detecting the presence of chloride ion can detect chloride ion concentrations in the fabric care product of greater than 1000 ppm.

8. The kit of claim 1, wherein the at least one test protocol for detecting the presence of a preservative component is selected from the group consisting of a test protocol for detecting the presence of a formaldehyde releasing agent in a haircare product, a skincare product or a cosmetics product; a test protocol for detecting the presence of ethylenediaminetetraacetic acid in a haircare product or a skincare product; a test protocol for detecting the presence of benzoate in a haircare product, a beverage product, or a skincare product; and a test protocol for detecting the presence of parabens in a haircare product, a skincare product, or a cosmetics product.

9. The kit of claim 1, wherein the kit is configured as a portable counterfeit detection kit where at least one test protocol is applied to one or more different tested consumer products and the results compared to the results from an authentic consumer product.

10. The kit of claim 9, wherein the kit is configured to be used in one or more of a customs warehouse, a retail outlet, a wholesale supply store, a manufacturing plant, a distributor, a consumer's home, and a shipping or receiving facility.

11. The kit of claim 1, wherein at least one of the test protocols comprises one or more test strips or test solutions for detecting a concentration of one or more specific components of a counterfeit or authentic consumer product.

12. A method for detecting counterfeit consumer products comprising:

selecting a consumer product for testing;

selecting an appropriate test protocol from a kit for detecting counterfeit consumer products, wherein the kit for detecting counterfeit consumer products comprises at least one test protocol for detecting the presence of an active component in the consumer product; at least one test protocol for detecting the presence of a diluent component or a metal ion component in a consumer product, the protocol comprising chlorine test strips; and at least one test protocol for detecting the presence of a preservative component in a consumer product, the protocol comprising a formaldehyde releasing agent and formaldehyde test strips;

testing the consumer product with the test protocol; and analyzing results of the test protocol to determine whether the consumer product is counterfeit or authentic.

13. The method of claim 12, wherein the consumer product is selected from the group consisting of a haircare product, a skincare product, a fabric care product, a dental care product, a fine fragrance product, a health care product, a homecare product, a cosmetics product, a battery, a beverage product, and a razor or razor blade product.

14. The method of claim 12, wherein the consumer product is part of an import or export shipment.

15. A method for producing a kit for detecting counterfeit consumer products comprising:

selecting a set of test protocols for detecting counterfeit consumer products comprising at least one test protocol for detecting the presence of an active component in a consumer product; at least one test protocol for detecting the presence of a diluent component or a metal ion component in a consumer product, the protocol comprising chlorine test strips; and at least one test protocol for detecting the presence of a preservative component in a consumer product, the protocol comprising a formaldehyde releasing agent and formaldehyde test strips;

configuring the set of test protocols in a kit for detecting counterfeit consumer products; and providing instructions for using the test protocols to detect counterfeit consumer products.

16. The method of claim 15, wherein providing instructions comprises placing instructions within the kit, wherein the instructions for using the test protocols are in a form selected from the groups consisting of written instructions, pictorial instructions, audio instructions, video instructions, and combinations of any thereof.

17. The method of claim 15, wherein providing instructions comprises training a user on the use of the test protocols.

18. The method of claim 15, wherein the kit for detecting counterfeit consumer products is configured as a portable counterfeit detection kit.

* * * * *